United States Patent [19]
Carabateas

[11] 3,860,600
[45] Jan. 14, 1975

[54] OCTAHYDROPYRRIDO[2,1-C][1,4]BENZODIAZEPINES

[75] Inventor: Philip M. Carabateas, Schodack, N.Y.

[73] Assignee: Sterling Drug Inc., New York, N.Y.

[22] Filed: Jan. 29, 1973

[21] Appl. No.: 327,324

Related U.S. Application Data

[62] Division of Ser. No. 270,463, July 10, 1972, Pat. No. 3,763,183, which is a division of Ser. No. 30,315, April 20, 1970, Pat. No. 3,732,212.

[52] U.S. Cl. .......................................... 260/293.55
[51] Int. Cl. ............................................ C07d 53/06
[58] Field of Search ............................... 260/293.55

[56] References Cited
UNITED STATES PATENTS

| | | | |
|---|---|---|---|
| 3,336,321 | 8/1967 | Doebel et al. | 260/294.3 |
| 3,483,187 | 12/1969 | Doebel et al. | 260/239.3 |

*Primary Examiner*—G. Thomas Todd
*Attorney, Agent, or Firm*—William G. Webb; B. W. Wyatt

[57] ABSTRACT

Heterocyclo[1,4]-benzodiazepine derivatives having analgesic antagonist, anti-inflammatory, and psychomotor depressant activity.

9 Claims, No Drawings

OCTAHYDROPYRRIDO[2,1-C][1,4]BENZODIAZEPINES

This is a division of application Ser. No. 270,463, filed July 10, 1972, now U.S. Pat. No. 3,763,183, patented Oct. 2, 1973, which in turn is a division of application Ser. No. 30,315, filed Apr. 20, 1970, now U.S. Pat. No. 3,732,212, patented May 8, 1973.

This invention relates to heterocyclo[1,4]benzodiazepine derivatives having the formula:

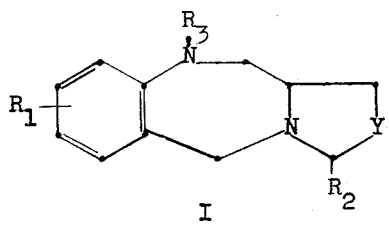

I wherein $R_1$ is hydrogen or methylenedioxy attached to adjacent carbon atoms or from one to three members of the group consisting of lower-alkyl, lower-alkoxy, fluorine, chlorine, di-lower-alkylamino, N-lower-alkyl-N-lower-alkanoylamino, hydroxy, and benzyloxy; $R_2$ is a member of the group consisting of hydrogen, hydroxymethyl, or lower-alkanoyloxymethyl; $R_3$ is lower-alkyl, lower-alkanoyl, α-lower-alkanoyloxy-lower-alkanoyl, benzoyl, benzyl, or benzoyl or benzyl substituted by methylenedioxy attached to adjacent carbon atoms or from one to three members of the group consisting of lower-alkyl, lower-alkoxy, fluorine, chlorine, lower-alkylmercapto, lower-alkylsulfinyl, lower-alkylsulfonyl, or hydroxy; and Y is one of the groups:

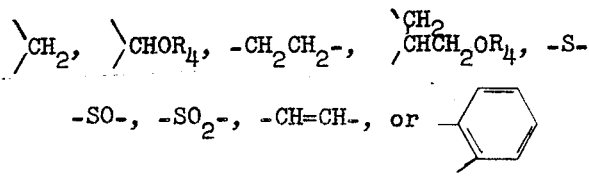

(i.e., o-phenylene), where $R_4$ is hydrogen or lower-alkanoyl.

As used herein the terms lower-alkyl, lower-alkoxy, di-lower-alkylamino, N-lower-alkyl-N-lower-alkanoylamino, lower-alkylmercapto, lower-alkylsulfinyl, lower-alkylsulfonyl and lower-alkanoyl mean such groups which can be either straight or branched, and which can contain from one to seven carbon atoms, and thus the lower-alkyl moiety of such groups represents, for example, methyl, ethyl, n-propyl, isopropyl, isobutyl, n-heptyl, and the like, and the lower-alkanoyl moiety of such groups represents, for example, formyl, ethyl, propionyl, α-methylhexanoyl, and the like.

The preparation of the compounds of formula I where $R_4$ is hydrogen is illustrated by the following flow diagram where $R_1$, $R_2$, $R_3$, and Y have the meanings given above, and R represents hydrogen or lower-alkyl:

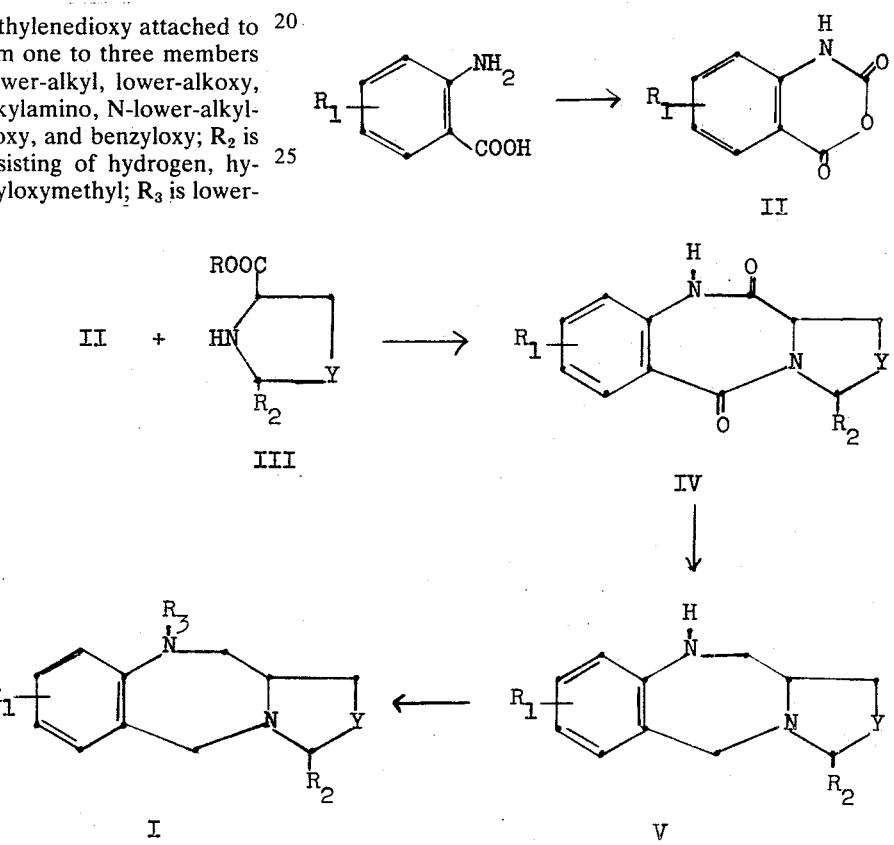

The isatoic anhydrides of formula II, which are required as starting materials, belong to a generally known class and are readily prepared by known methods, as generally indicated in the flow diagram above, by reaction of an anthranilic acid either with ethyl chloroformate [e.g. see Heilbron et al., J. Chem. Soc. 127, 2171 (1965)] or with phosgene [e.g., see Wagner et al., Org. Syn. 27, 45 (1947)].

The isatoic anhydride thus prepared is then reacted with a nitrogen containing heterocyclic 2-carboxylic acid or ester of formula III, where Y has each of the meanings given above, and $R_2$ is hydrogen, hydroxymethyl, lower-alakanoyloxymethyl, or carbo-lower-alkoxy, to give the benzodiazepinediones of formula IV. The reaction is preferably carried out in an organic solvent inert under the conditions of the reaction, for example, dimethylformamide, dioxane, tetrahydrofuran, dimethylsulfoxide, hexamethylphosphoramide, or tetramethylurea, and at a temperature in the range from 100°–150°C. The reaction is advantageously carried out by refluxing a solution of the reactants of formulas II and III in dimethylformamide.

Alternatively, the compounds of formula IV are prepared by reaction of a 2-nitrobenzoyl chloride of formula VI, in which $R_1$, in addition to having the meanings given above, can also be nitro, with a compound of formula III to give the benzamide derivatives of formula VII, which on catalytic reduction over a suitable catalyst, for example Raney nickel, affords the compounds of formula IV. During the reduction, the $R_1$ group, when nitro, is likewise reduced to an amine function, and when $R_1$ is nitro, it is preferable to carry out the reduction in glacial acetic acid-acetic anhydride in which case the product of formula IV is isolated in the form of a compound in which $R_1$ is acetylamino. The method is illustrated by the following reaction sequence where R, $R_1$, $R_2$, and Y have the meanings given above:

alkoxy, or lower-alkanoyloxymethyl are reduced to the compounds of formula V where $R_2$ is hydroxymethyl ($CH_2OH$), and those where $R_4$ is lower-alkanoyl are likewise cleaved to the corresponding alcohol where $R_4$ is hydrogen.

The compounds of formula I where $R_3$ is lower-alkanoyl, benzoyl, or substituted-benzoyl are prepared by reaction of the compounds of formula V either with an appropriate acid anhydride ($R_3CO-O-COR_3$) in the presence of a catalytic amount of sulfuric acid or with an appropriate acid halide ($R_3CO-X$ where X is halogen). The reaction is preferably carried out in an organic solvent inert under the conditions of the reaction, for example, chloroform, methylene dichloride, ethylene dichloride, benzene, toluene, and the like. The reaction with a lower-alkanoic acid anhydride is advantageously carried out using an excess of the anhydride as a solvent.

The compounds of formula I where $R_3$ is lower-alkyl, benzyl, or substituted-benzyl are prepared by reducing the corresponding compounds where $R_3$ is lower-

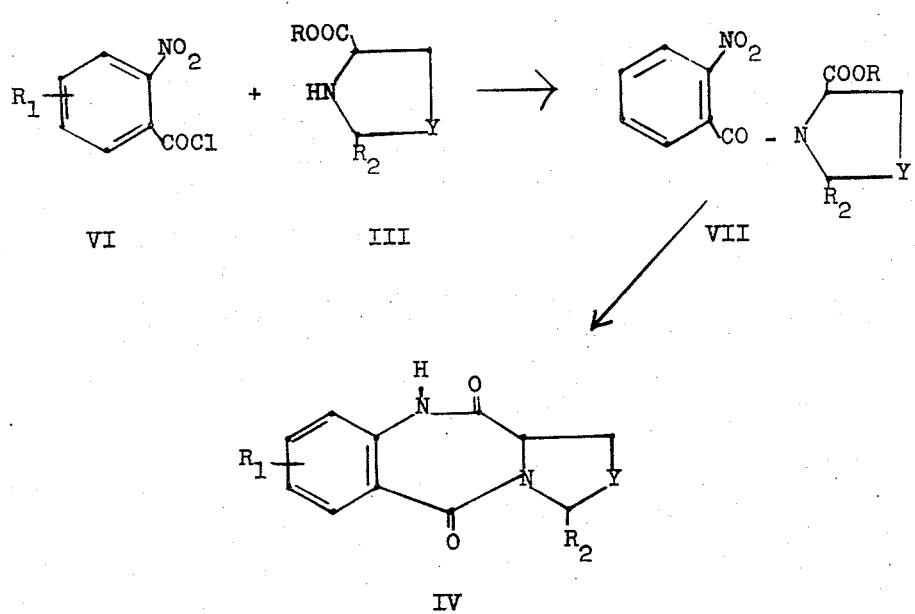

The 2-nitrobenzoyl chlorides of formula VI are in turn readily prepared from the corresponding 2-nitrobenzoic acids, which belong to a very large and well-known class of compounds, by reaction of the latter with thionyl chloride according to known procedures.

The benzamides of formula VII in which Y is a sulfur-containing group, i.e., —S—, —SO—, or —$SO_2$— are best reduced to the benzodiazepinediones of formula IV by chemical methods of reduction, since the sulfur tends to poison the catalyst and thus render it ineffective when catalytic methods of reduction are used. In such cases, it is preferred to carry out the reduction with iron powder in the presence of glacial acetic acid.

The benzodiazepinediones of formula IV are then converted to the benzodiazepines of formula V by alkali metal aluminum hydride reduction of the former. The reaction is preferably carried out in an organic solvent inert under the conditions of the reaction, for example, diethyl ether, tetrahydrofuran, dibutyl ether, and the like, at temperatures in the range of 0°–100°C. During the reduction, groups where $R_2$ is carbo-loweralkanoyl, benzoyl, or substituted-benzoyl with an alkali metal aluminum hydride as described above.

The compounds of formula I where Y is sulfinyl or sulfonyl, i.e. where Y is one of the groups —SO—, and —$SO_2$—, respectively, are prepared by oxidation of the corresponding sulfides, that is the compounds of formula I where Y is —S—, with, respectively, an alkali metal periodate or an alkali metal permanganate according to generally known procedures. If desired, the oxidation can also be effected by use of either one or two moles of hyrogen peroxide in a suitable solvent, for example, glacial acetic acid.

The compounds of formula I where $R_4$ is lower-alkanoyl are prepared by reaction of the corresponding compounds where $R_4$ is hydrogen with a lower-alkanoyl halide in an inert organic solvent, for example methylene dichloride, or with a lower-alkanoic anhydride in the presence of a small amount of pyridine.

The acid-addition salts of the bases herein described are the form in which the bases are most conveniently prepared for use. The acid moieties or anions in these salt forms are in themselves neither novel nor critical and therefore can be any acid anion or acid-like substance capable of salt formation with the free base form of the compounds. The preferred type of salts are water-soluble pharmacologically acceptable salts, that is, salts, whose anions are relatively innocuous to the animal organisms in pharmacological doses of the salts, so that the beneficial physiological properties inherent in the free base are not vitiated by side effects ascribable to the anions; in other words, the latter do not substantially affect the pharmacological properties inherent in the cations. Appropriate pharmacologically acceptable salts within the scope of the invention are those derived from mineral acids such as hydrobromic acid, nitric acid, phosphoric acid, sulfamic acid and sulfuric acid; and organic acids such as acetic acid, citric acid, tartaric acid, lactic acid, methanesulfonic acid, ethanesulfonic acid, quinic acid, and the like, giving the hydrobromide, nitrate, phosphate, sulfamate, sulfate, acetate, citrate, tartrate, lactate, methanesulfonate, ethanesulfonate, and quinate salts, respectively.

Although pharmacologically acceptable salts are preferred, those having toxic anions are also useful. All acid-addition salts are useful intermediates as sources of the free base form even if the particular salt per se is not desired as the final product, as for example when the salt is formed only for purposes of purification or identification, or when it is used as an intermediate in preparing a pharmacologically acceptable salt by ion-exchange procedures.

Pharmacological evaluation of the compounds of formula I according to standard pharmacological test procedures has demonstrated that they possess analgesic antagonist, anti-inflammatory, and psychomotor depressant activities thus indicating their usefulness as antagonists of the depressant effects of strong analgesics, as anti-inflammatory agents, and as tranquilizers.

Analgesic antagonist activity was determined according to the method of Harris and Pierson, J. Pharmacol. Exp. Therap. 143, 141 (1964) in which the antagonistic potency of the compounds was assessed by the ability of the compounds to block the typical delayed response time to a thermal stimulus shown by rats medicated with a strong analgesic. The tail flick procedure described by Bass et al., J. Amer. Pharm. Assoc. 41, 569 (1952) was used. Logarithmically spaced doses of the test compounds were administered subcutaneously to eighteen rats per dose level 10 minutes prior to subcutaneous medication with 60 mg./kg. of meperidine hydrochloride, which is the standard dose which consistently gives an 80 percent analgesic effect in un-premedicated animals and is taken as the maximum possible analgesic effect (MPE) or 100 percent. Experimental readings were made 30 minutes after medication with the meperidine. Active antagonists cause a dose-dependent decrease in the expected 80 percent effect of the meperidine. The difference between the MPE and the analgesic effect of meperidine plus the antagonist is equal to the effect of the antagonist. This percent was plotted against the dose of antagonist on log-probit paper to obtain the $AD_{50}$, i.e., the dose causing 50 percent antagonism of the MPE of meperidine.

The compounds of the invention, when administered subcutaneously to rats in the above-described analgesic antagonist test, were found to be active in the dose range from 10 to 100 mg./kg. of body weight.

Anti-inflammatory activity of the compounds was determined by one or more of three standards test procedures for determination of anti-inflammatory activity, namely by the inhibition of carrageenin-induced foot edema in rats, by the adjuvant-induced arthritis test, and by the inhibition of asbestos pellet induced granuloma test.

The inhibition of carrageenin-induced local foot edema test used is generally described by Winter et al., Proc. Soc. Exp. Biol. Med. 111, 544 (1962). The tests were carried out in fasted male Sprague-Dawley rats weighing approximately 100 to 115 grams from which all food was withdrawn twenty-four hours prior to medication. The rats were divided into groups of at least five rats per group, and suspensions of the compounds in gum tragacanth were administered by stomach tube in a volume of 1 ml. per 100 g. of body weight. A control group of animals received only the gum tragacanth. This treatment was followed one hour later by injection into the plantar tissue of the right hind paw of all test and control animals of 0.05 ml. of a 1 percent aqueous suspension of carrageenin. As a control, the left hind paw was similarly injected with saline. Swelling of the carrageenin-injected paw reached a peak in from three to five hours, and the increase in swelling three hours after injection of the carrageenin was adopted as a measure of effect. The inhibition of carrageenin-induced edema in treated animals over untreated controls is then determined by procedures involving either a measure of the relative weights or volumes of the edema. A preferred method, involving the determination of the volume of the edema, is described as follows: Three hours following carrageenin injection, the increase in foot volume, i.e., the edema formation (the difference between the left hind paw and the uninjected right hind paw) was measured plethysmographically. The extended paw was immersed to the top of the most proximal callus pad into a mercury filled glass cylinder connected to a pressure transducer and the impulse amplified and recorded by a polygraph. The polygraph was standardized so that a 3.6 mm. deflection on the recording paper was equivalent to 0.1 ml. volume. The results were expressed either in terms of the percent inhibition at a dose of 100 mg./kg. calculated from the average differences in foot volume between the control and medicated rats or in terms of the $AED_{40}$, the Average Effective Dose producing 40 percent inhibition of the inflammation, the latter value being calculated from a dose-response curve.

The adjuvant-induced arthritis test used is a modification of that described by Pearson, J. Chronic Diseases, 16, 863 (1963) and Glen et al., Am. J. Vet. Res., 26, 1180 (1965). Adult male rats weighing 200–230 g. were injected into the plantar tissue of the left hind paw with 0.1 ml. of a 0.6 percent suspension of adjuvant in heavy mineral oil. A negative control group was injected with the mineral oil only. Beginning on the ninth day after injection, suspensions of the test compounds in 1 percent gum tragacanth were administered by stomach tube six times daily to the animals in a volume of 1 ml. per 100 g. of body weight. Both the negative control and the adjuvant injected control animals received the vehicle only. Food and water were permitted ad libitum, and twenty-four hours following the last medication, the animals were weighed, and the increase in foot volume was measured plethysmographically as described above. The results were expressed as percent inhibition calculated from the average differences in foot volume between the adjuvant injected control and medicated rats correcting the difference in foot volume of the oil injected negative control group.

The asbestos pellet test used is a modification of the method described by Meier et al., Experientia, 6, 469 (1950). Young male rats weighing 100–120 g. were placed under light ether anaesthesia, and a single sterilized asbestos pellet, punched from Leitz No. 3 filter pads and weighing approximately 30 mg., was implanted subcutanaeously in the interscapular area via a small skin incision and closed with a wound clip. Beginning on the day of pellet implantation, the animals were administered by stomach tube seven daily medications of the test compound suspended in 1 percent gum tragacanth in a volume of 1 ml. per 100 g. of body weight. Control animals were given the vehicle only. Food and water were permitted ad libitum, and twenty-four hours following the last medication, the animals were weighed, sacrificed, and the pellets with surrounding granuloma were carefully removed and weighed. The results were expressed as percent inhibition of fresh granuloma weights calculated from the differences between the average granuloma weights of control and medicated rats.

The compounds of the invention, when administered orally to rats in the above-described anti-inflammatory tests, were found to be active in the dose range from 20 to 100 mg./kg. of body weight.

Psychomotor depressant activity was determined in standard activity cages using the method of Dews, Brit. J. Pharmacol. 8, 46 (1953) in which mice, medicated orally with the test compound, are placed in wire mesh cages equipped with a photoelectric cell so adjusted that a mouse breaking the beam activates a magnetic digital counter. Thus the number of times the light beam is broken over a period of time is an indication of the motor activity of the animals, and a reduction in the number of counts in the medicated mice over control groups, run simultaneously, is taken as evidence of psychomotor depressant activity. The dose at which such reduction in motor activity was observed was recorded as the active dose. Alternatively, the $ED_{50}$, the Effective Dose in 50 percent of the animals, was determined from a dose-response curve.

Instead of determining the motor activity of the test animals using a digital counter activated by a photoelectric cell, there can be also used a counting apparatus such as described by Bonta et al., Arch. int. pharmacodyn. 129, 381–394 (1960) in which vertically movable leaf springs affixed to the activity cages activate a direct current ampere hour meter which serves as a counter of the recorded activity. Moreover, as these authors show, compounds which depress motor activity of mice in such activity cages are indicated to possess tranquilizer activity.

The compounds of the invention, when administered orally to mice in the above-described psychomotor activity test, were found to be active in the dose range of from 8 to 300 mg./kg. of body weight.

The compounds can be prepared for use by dissolving under sterile conditions a salt form of the compounds in water (or an equivalent amount of a nontoxic acid if the free base is used), or in a physiologically compatible aqueous medium such as saline, and stored in ampoules for use by injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared.

The chemical structure of the compounds of the invention are established by their mode of synthesis and are corroborated by infrared and ultraviolet spectra, and by the correspondence between calculated values for the elements and values found by chemical analysis.

The following examples will further illustrate specific embodiments of the invention. All melting points are uncorrected.

EXAMPLE 1

A.  1,2,3,10,11,11a-Hexahydro-5H-pyrrolo[2,1-c][1,4]benzodiazepine-5,11-dione

A solution of 22 g. (0.14 mole) of isatoic anhydride and 15.6 g. (0.14 mole) of L-(-)proline in 100 ml. of dimethylformamide was heated under reflux for three hours. The reaction mixture was then poured into 600 ml. of ice water, stirred, chilled, and the solid precipitate was collected by filtration and washed with water. The product thus obtained was recrystallized from isopropanol to give 23.6 g. of 1,2,3,10,11,11a-hexahydro-5H-pyrrolo[2,1-c][1,4]-benzodiazepine-5,11-dione, m.p. 216°–218°C. having the formula:

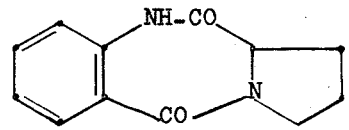

B.  1,2,3,10,11,11a-Hexahydro-5H-pyrrolo[2,1-c][1,4]benzodiazepine

To a stirred solution of 13.7 g. (0.36 mole) of lithium aluminum hydride in 400 ml. of tetrahydrofuran was added 39 g. (0.18 mole) of 1,2,3,10,11,11a-hexahydro-5H-pyrrolo[2,1-c][1,4]benzodiazepine-5,11-dione in portions, and the reaction mixture was heated under reflux for about ten hours. The reaction mixture was then treated dropwise with chilling first with 18 ml. of water and then with 8 ml. of a saturated aqueous solution of sodium potassium tartrate. After stirring for an hour, the mixture was filtered, the filter was washed with tetrahydrofuran, and the filtrate was taken to dryness in vacuo after removing traces of moisture by azeotropic evaporation with benzene. The crude material thus obtained was recrystallized once from cyclohexane, once from n-hexane, and then chromatographed on a column of silica gel using 3 percent isopropylamine in benzene as eluent. There was thus obtained 5.6 g. of 1,2,3,10,11,11a-hexahydro-5H-pyrrolo[2,1-c][1,4]benzodiazepine, m.p. 106.5°–109°C.

C.  10-Propionyl-1,2,3,10,11,11a-hexahydro-5H-pyrrolo[2,1-c]-[1,4]benzodiazepine hydrochloride To 65 ml. of propionic anhydride was added 13.2 g. (0.07 mole) of 1,2,3,10,11,11a-hexahydro-5H-pyrrolo[2,1-c]-[1,4]benzodiazepine, the solution was treated with one drop of concentrated sulfuric acid, and the mixture was allowed to stand at room temperature for four days. The reaction mixture was then poured into 200 ml. of methanol, and after standing for one hour, was concentrated in vacuo to an oil. The latter was stirred for five minutes with 5 percent aqueous potassium carbonate, extracted three times with methylene dichloride, and the extracts were concentrated to dryness. The residual oil was taken into diethyl ether, the solution treated with anhydrous ethereal hydrogen chloride, and the gum which separated was triturated with acetone, and recrystallized once from propionitrile and once from isopropanol to give 3.2 g. of 10-propionyl-1,2,3,10,11,11a-hexahydro-5H-pyrrolo[2,1-c][1,4]benzodiazepine hydrochloride, m.p. 230°–231°C.

EXAMPLE 2

10-(α-Acetoxypropionyl)-1,2,3,10,11,11a-hexahydro-5H-pyrrolo-[2,1-c][1,4]benzodiazepine hydrochloride A solution of 13.9 g. (0.074 mole) of 1,2,3,10,11,11-a-hexahydro-5H-pyrrolo[2,1-c][1,4]benzodiazepine in chloroform was treated dropwise with stirring at 10°C. with 11.2 g. (0.075 mole) of α-acetoxypropionyl chloride, and when addition was complete the mixture was heated on a steam bath for one hour. The reaction mixture was then taken to dryness, the residual semi-solid was crystallized once from ethanol/ether and once from isopropanol/ether to give 7.4 g. of 10-(α-acetoxypropionyl)-1,2,3,10,11,11a-hexahydro-5H-pyrrolo-[2,1-c][1,4]benzodiazepine hydrochloride, m.p. 257°–259°C.

EXAMPLE 3

A. 10-Formyl-1,2,3,10,11,11a-hexahydro-5H-pyrrolo[2,1-c][1,4]benzodiazepine

A solution of 18.8 g. (0.1 mole) of 1,2,3,10,11,11a-hexahydro-5H-pyrrolo[2,1-c][1,4]benzodiazepine in 12 g. (0.25 mole) of 98 percent formic acid was treated with 8.6 g. (0.11 mole) of 37 percent formaldehyde, and the mixture was heated on a steam bath for about nineteen hours. The reaction mixture was rendered alkaline with solid sodium carbonate and 10 percent aqueous sodium hydroxide, extracted with diethyl ether, and the ether extracts, after washing with brine, were concentrated to dryness to give 10-formyl-1,2,3,10,11,11a-hexahydro-5H-pyrrolo[2,1-c][1,4]benzodiazepine as an oil.

B. 10-Methyl-1,2,3,10,11,11a-hexahydro-5H-pyrrolo[2,1-c]-[1,4]benzodiazepine was prepared by reducing 17.5 g. (0.08 mole) of 10-formyl-1,2,3,10,11,11a-hexahydro-5H-pyrrolo[2,1-c][1,4]--benzodiazepine with 3.8 g. (0.1 mole) of lithium aluminum hydride in 125 ml. of tetrahydrofuran using the procedure described above in Example 1B. The material thus obtained was purified by distillation in vacuo to give 8.0 g. of 10-methyl-1,2,3.10.11.11a-hexahydro-5H-pyrrolo[2,1-c][1,4]-benzodiazepine as a clear oil, b.p. 92°–94°C./0.004 mm., $n_D^{24}$ 1.5728.

EXAMPLE 4

A. 7-Chloro-1,2,3,10,11,11a-hexahydro-5H-pyrrolo[2,1-c][1,4]-benzodiazepine-5,11-dione was prepared by reaction of 7.9 g. (0.04 mole) of 5-chloroisatoic anhydride with 4.6 g. (0.4 mole) of L-(-)proline in 30 ml. of dimethylformamide using the procedure described above in Example 1A. The crude material thus obtained was recrystallized from an isopropanol/water mixture to give 5.6 g. of 7-chloro-1,2,3,10,11,11a-hexahydro-5H-pyrrolo[2,1-c][1,4]benzodiazepine-5,11-dione, m.p. 222°–224.5°C. having the formula:

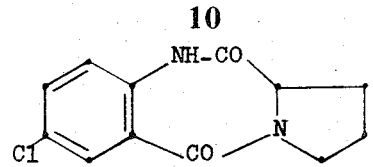

B. 7-Chloro-1,2,3,10,11,11a-hexahydro-5H-pyrrolo[2,1-c][1,4]- was prepared by reducing 37.2 g. (0.148 mole) of 7-chloro-1,2,3,10,11,11a-hexahydro-5H-pyrrolo[2,1-c][1,4]- benzodiazepine-5,11-dione with 11.2 g. (0.30 mole) of lithium aluminum hydride in 300 ml. of tetrahydrofuran using the procedure described above in Example 1B. The product was isolated in the form of the free base and recrystallized from benzene/cyclohexane to give 3.4 g. of 7-chloro-1,2,3,10,11,11a-hexahydro-5H-pyrrolo[2,1-c][1,4]benzodiazepine, m.p. 124°–127°C.

C. 7-Chloro-10-propionyl-1,2,3,10,11,11a-hexahydro-5H-pyrrolo[2,1-c][1,4]benzodiazepine p-toluenesulfonate was prepared by reaction of 9.0 g. (0.041 mole) of 7-chloro-1,2,3,10,11,11a-hexahydro-5H-pyrrolo[2,1-c][1,4]benzodiazepine with 4.0 g. (0.0432 mole) of propionyl chloride in 200 ml. of chloroform using the procedure described above in Example 2. The product was isolated in the form of its p-toluenesulfonate salt and recrystallized once from acetonitrile/ether and once from acetonitrile to give 3.8 g. of 7-chloro-10-propionyl-1,2,3,10,11,11a-hexahydro-5H-pyrrolo[2,1-c][1,4]benzodiazepine p-toluenesulfonate, m.p. 173°–174°C.

EXAMPLE 5

A. 7-Nitro-1,2,3,10,11,11a-hexahydro-5H-pyrrolo[2,1-c][1,4]- benzodiazepine-5,11-dione was prepared by reaction of 8.0 g. (0.038 mole) of 5-nitroisatoic anhydride with 4.4 g. (0.038 mole) of L-(-)proline in 30 ml. of dimethylformamide using the procedure described above in Example 1A. The product thus obtained was recrystallized from acetonitrile giving 5.9 g. of 7-nitro-1,2,3,10,11,11a-hexahydro-5H-pyrrolo[2,1-c]-[1,4]benzodiazepine-5,11-dione, m.p. 246°–248°C. having the formula:

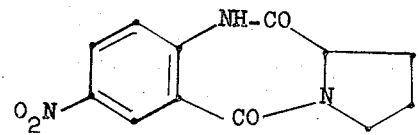

B. 7-Acetylamino-1,2,3,10,11,11a-hexahydro-5H-pyrrolo[2,1-c]-[1,4]benzodiazepine-5,11-dione is prepared by catalytic reduction of 7-nitro-1,2,3,10,11,11a-hexahydro-5H-pyrrolo-[2,1-c][1,4]benzodiazepine-5,11-dione with hydrogen over a platinum oxide catalyst in glacial acetic acid/acetic anhydride.

C. 7-(N-Ethylamino)-1,2,3,10,11,11a-hexahydro-5H-pyrrolo[2,1-c]-[1,4]benzodiazepine is prepared by lithium aluminum hydride reduction in tetrahydrofuran of 7-acetylamino-1,2,3,10,11,11a-hexahydro-5H-pyrrolo[2,1-c][1,4]benzodiazepine-5,11-dione using the procedure described above in Example 1B.

D. 7-(N-Ethyl-N-propionylamino)-10-propionyl-1,2,3,10,11,11a-hexahydro-5H-pyrrolo[2,1-c][1,4]benzodiazepine is prepared by reaction of 7-ethylamino-1,2,3,10,11,11a-hexahydro-5H-pyrrolo-[2,1-c][1,4]benzodiazepine with two molar equivalents of propionyl chloride in chloroform using the procedure described above in Example 2.

EXAMPLE 6

A. 2-Hydroxy-1,2,3,10,11,11a-hexahydro-5H-pyrrolo[2,1-c][1,4]-benzodiazepine-5,11-dione was prepared by reaction of 22.0 g. (0.14 mole) of isatoic anhydride with 17.2 g. (0.13 mole) of hydroxyl-L-(-)proline having the formula:

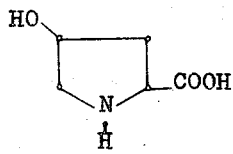

in 75 ml. of dimethylformamide using the procedure described above in Example 1A. The crude product was recrystallized twice from acetonitrile to give 4.6 g. of 2-hydroxy-1,2,3,10,11,11a-hexahydro-5H-pyrrolo[2,1-c][1,4]benzodiazepine, m.p. 219°–222°C. having the formula:

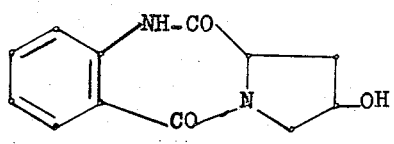

B. 2-Hydroxy-1,2,3,10,11,11a-hexahydro-5H-pyrrolo[2,1-c][1,4]-benzadiazepine was prepared by reducing 16.6 g. (0.072 mole) of 2-hydroxy-1,2,3,10,11,11a-hexahydro-5H-pyrrolo[2,1-c][1,4]-benzodiazepine-5,11-dione with 5.8 g. (0.15 mole) of lithium aluminum hydride in 200 ml. of tetrahydrofuran using the procedure described above in Example 1B. The product thus obtained was recrystallized twice from ethyl acetate to give 3.2 g. of 2-hydroxy-1,2,3,10,11,11a-hexahydro-5H-pyrrolo-[2,1-c][1,4]benzodiazepine, m.p. 153.5°–155°C.

C. 2-Hydroxy-10-propionyl-1,2,3,10,11,11a-hexahydro-5H-pyrrolo[2,1-c][1,4]benzodiazepine hydrochloride was prepared by reaction of 2-hydroxy-1,2,3,10,11,11a-hexahydro-5H-pyrrolo-[2,1-c][1,4]benzodiazepine with propionic anhydride in the presence of a drop of sulfuric acid using the procedure described above in Example 1C. The crude product thus obtained was purified by chromatographing on a column of silica gel using 3 percent isopropylamine in benzene as solvent and 3 percent isopropanol in benzene as eluent. The oily base thus obtained was converted to the hydrochloride salt, and the latter was recrystallized from ethanol to give 2-hydroxy-10-propionyl-1,2,3,10,11,11a-hexahydro-5H-pyrrolo[2,1-c][1,4]benzodiazepine hydrochloride, m.p. 260°–262°C.

EXAMPLE 7

A. 1,2,3,4,6,11,12,12a-Octahydropyrido[2,1-c][1,4-c]benzodiazepine-6,12-dione was prepared by reaction of 16.3 g. (0.1 mole) of isatoic anhydride with 12.9 g. (0.1 mole) of α-pipecolinic acid in 70 ml. of dimethylformamide using the procedure described above in Example 1A. The product thus obtained was recrystallized twice from ethanol to give 7.3 g. of 1,2,3,4,6,11,1-2,12a-octahydropyrido[2,1-c][1,4]benzodiazepine-6,12-dione, m.p. 227°–229°C. having the formula:

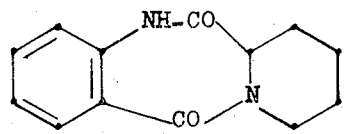

B. 1,2,3,4,6,11,12,12a-Octahydropyrido[2,1-c][1,4]benzodiazepine was prepared by reduction of 34.7 g. (0.15 mole) of 1,2,3,4,6,11,12,12a-octahydropyrido[2,1-c][1,4]benzodiazepine-6,12-dione with 17.1 g. (0.45 mole) of lithium aluminum hydride in 500 ml. of tetrahydrofuran using the procedure described above in Example 1B. The crude product thus obtained was recrystallized from cyclohexane to give 27.6 g. of 1,2,3,4,6,11,12,12a-octahydropyrido[2,1-c][1,4]benzodiazepine, m.p. 105°–107°C.

C. 11-Acetyl-1,2,3,4,6,11,12,12a-octahydropyrido[2,1-c][1,4]- benzodiazepine hydrochloride was prepared by reaction of 8.1 g. (0.04 mole) of 1,2,3,4,6,11,12,12a-octahydropyrido[2,1-c]-[1,4]benzodiazepine with 3.14 g. (0.04 mole) of acetyl chloride in 50 ml. of chloroform using the procedure described above in Example 2. The product was isolated in the form of the hydrochloride salt and recrystallized from acetonitrile to give 8.8 g. of 11-acetyl-1,2,3,4,6,11,12,12a-octahydropyrido-[2,1-c][1,4]benzodiazepine hydrochloride, m.p. 261°–263°C.

EXAMPLE 8

11-Propionyl-1,2,3,4,6,11,12,12a-octahydropyrido[2,1-c][1,4]-benzodiazepine hydrochloride was prepared by reaction of 11.1 g. (0.055 mole) of 1,2,3,4,6,11,12,12a-octahydropyrido-[2,1-c][1,4]benzodiazepine with 30 ml. of propionic anhydride in the presence of one drop of sulfuric acid using the procedure described above in Example 1C. The product thus obtained was isolated in the form of the hydrochloride salt and recrystallized from butyronitrile giving 9.0 g. of 11-propionyl-1,2,3,4,6,11,12,12a-octahydropyrido[2,1-c][1,4]benzodiazepine hydrochlorie, m.p. 246°–248°C.

EXAMPLE 9

11-Benzoyl-1,2,3,4,6,11,12,12a-octahydropyrido[2,1-c][1,4]-benzodiazepine hydrochloride was prepared by reaction of 8.1 g. (0.04 mole) of 1,2,3,4,6,11,12,12a-octahydropyrido[2,1-c]-[1,4]benzodiazepine with 5.65 g. (0.04 mole) of benzoyl chloride in chloroform using the procedure described above in Example 2. The product was isolated in the form of the hydrochloride salt and recrystallized from acetonitrile to give 9.9 g. of 11-benzoyl-1,2,3,4,6,11,12,12a-octahydropyrido[2,1-c][1,4]benzodiazepine hydrochloride, m.p. 257°–259°C.

EXAMPLE 10

A. 8-Chloro-1,2,3,4,6,11,12,12a-octahydropyrido[2,1-c][1,4]-benzodiazepine-6,12-dione To a solution of 33.0 g. (0.15 mole) of 2-nitro-5-chlorobenzoyl chloride in 100 ml. of chloroform was added 26.6 g. (0.15 mole) of methyl α-pipecolinate. The solution was then treated dropwise, while cooling with an ice bath, with a solution of 45.2 g. (0.45 mole) of triethylamine in 50 ml. of chloroform. The mixture was allowed to stand overnight and was then washed twice with water, once with brine, dried over magnesium sulfate, and then taken to dryness to give a semicrystalline viscous oil which was recrystallized from isopropanol/pentane to give 23.9 g. of methyl 1-(2-nitro-5-chlorobenzoyl)piperidine-2-carboxylate, m.p. 95°-98°C.

The latter, dissolved in 700 ml. of methanol, was reduced over 1.5 g. of Raney nickel at 145°-165°C. under an initial hydrogen pressure of 933 pounds p.s.i. When reduction was complete, the catalyst was removed by filtration, the filtrate was taken to dryness, and the residue was recrystallized from methanol to give 2.9 g. of 8-chloro-1,2,3,4,6,11,12,12a-octahydropyrido[2,1-c][1,4]benzodiazepine-6,12-dione, m.p. 277°-280°C. having the formula:

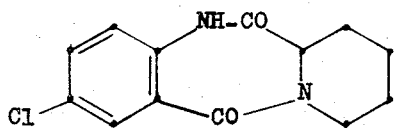

B. 8-Chloro-1,2,3,4,6,11,12,12a-octahydropyrido[2,1-c][1,4]-benzodiazepine hydrochloride was prepared by reduction of 16.0 g. (0.061 mole) of 8-chloro-1,2,3,4,6,11,12,12a-octahydropyrido[2,1-c][1,4]benzodiazepine-6,12-dione with 4.6 g. (0.12 mole) of lithium aluminum hydride in 175 ml. of tetrahydrofuran using the procedure described above in Example 1B. The product was isolated in the form of the hydrochloride salt and recrystallized twice from methanol/ether to give 2.1 g. of 8-chloro-1,2,3,4,6,11,12,12a-octahydropyrido[2,1-c][1,4]- benzodiazepine hydrochloride, m.p. 280°-283°C.

C. 8-Chloro-11-propionyl-1,2,3,4,6,11,12,12a-octahydropyrido-[2,1-c][1,4]benzodiazepine p-toluenesulfonate was prepared by reaction of 10.0 g. (0.04 mole) of 8-chloro-1,2,3,4,6,11,12,12a-octahydropyrido[2,1-c][1,4]benzodiazepine hyrochloride with 4.0 g. (0.04 mole) of propionyl chloride in 150 ml. of chloroform using the procedure described above in Example 2. The product was isolated in the form of the p-toluenesulfonate salt and recrystallized from isopropanol/ether to give 6.5 g. of 8-chloro-11-propionyl-1,2,3,4,6,11,12,12a-octahydropyrido-[2,1-c][1,4]benzodiazepine p-toluenesulfonate, m.p. 227.5°-230°C.

EXAMPLE 11

A. 8-Nitro-1,2,3,4,6,11,12,12a-octahydropyrido[2,1-c][1,4]-benzodiazepine-6,12-dione was prepared by reaction of 20.2 g. (0.097 mole) of 5-nitroisatoic anhydride with 12.5 g. (0.097 mole) of α-pipecolinic acid in 50 ml. of dimethylformamide using the procedure described above in Example 1A. The product thus obtained was recrystallized from aqueous dimethylformamide to give 7.6 g. of 8-nitro-1,2,3,4,6,11,12,12a-octahydropyrido-[2,1-c][1,4]benzodiazepine-6,12-dione, m.p. 297.5°-300°C. (dec.) having the formula:

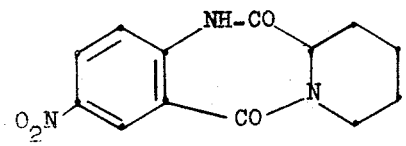

B. 8-Acetylamino-1,2,3,4,6,11,12,12a-octahydropyrido[2,1-c]-[1,4]benzodiazepine-6,12-dione is prepared by catalytic reduction of 8-nitro-1,2,3,4,6,11,12,12a-octahydropyrido-[2,1-c][1,4]benzodiazepine-6,12-dione over a platinum oxide catalyst in glacial acetic acid/acetic anhydride.

C. 8-(N-Ethylamino)-1,2,3,4,6,11,12,12a-octahydropyrido-[2,1-c][1,4]benzodiazepine is prepared by lithium aluminum hydride reduction of 8-acetylamino-1,2,3,4,6,11,12,12a-octahydropyrido[2,1-c][1,4]benzodiazepine-6,12-dione using the procedure described above in Example 1B.

D. 8-(N-Butyryl-N-ethylamino)-11-butyryl-1,2,3,4,6,11,12,12a-octahydropyrido[2,1-c][1,4]benzodiazepine is prepared by reaction of 8-ethylamino-1,2,3,4,6,11,12,12a-octahydropyrido[2,1-c][1,4]benzodiazepine with butyric anhydride in the presence of a small amount of sulfuric acid using the procedure described above in Example 1C.

EXAMPLE 12

A. 1,2,3,4,6,11,12,12a-Octahydropyrido[2,1-c][1,4]benzodiazepine-6,12-dione-3-carboxylic acid hydrate was prepared by reaction of 37.0 g. (0.18 mole) of dimethyl 2,5-piperidinedicarboxylate with 34.2 g. (0.18 mole) of 2-nitrobenzoyl chloride in 150 ml. of chloroform in the presence of 36.8 g. (0.37 mole) of triethylamine and catalytic reduction of the resulting dimethyl 1-(2-nitrobenzoyl)-2,5-piperidinedicarboxylate in methanol over a Raney nickel catalyst all according to the procedure described above in Example 10A. There was thus obtained methyl 1,2,3,4,6,11,12,12a-octahydropyrido[2,1-c][1,4]benzodiazepine-6,12-dione-3-carboxylate as a viscous oil. The latter (30.4 g., 0.105 mole) was saponified in an aqueous methanolic solution of potassium hydroxide, the product being isolated from a neutral solution and recrystallized from methanol/water to give 6.9 g. of 1,2,3,4,6,11,12,12a-octahydropyrido[2,1-c][1,4]-benzodiazepine-6,12-dione-3-carboxylic acid hydrate, m.p. 271°-273.5°C. having the formula:

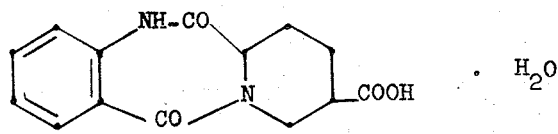

B. 3-Hydroxymethyl-1,2,3,4,6,11,12,12a-octahydropyrido[2,1-c]-[1,4]benzodiazepine was prepared by reduction of 6.9 g. (0.024 mole) of methyl 1,-2,3,4,6,11,12,12a-octahydropyrido[2,1-c]-[1,4]benzodiazepine-6,12-dione-3-carboxylate with 2.7 g. (0.072 mole) of lithium aluminum hydride in 200 ml. of tetrahydrofuran using the procedure described above in Example 1B. The product was isolated in the form of the free base and recrystallized from methanol/ether to give 5.4 g. of 3-hyroxymethyl-1,2,3,4,6,11,12,12a-octahydropyrido[2,1-c]-[1,4]benzodiazepine, m.p. 222.5°-226°C.

C. 3-Propionyloxymethyl-11-propionyl-1,2,3,4,6,11,12,12a-octahydropyrido[2,1-c][1,4]benzodiazepine was prepared by reaction of 5.4 g. (0.023 mole) of 3-hydroxymethyl-1,2,3,4,6,11,12,12a-octahydropyrido[2,1-c][1,4]benzodiazepine with 30 ml. of propionic anhydride using the procedure described above in Example 1C. The product was isolated in the form of the hydrochloride salt and recrystallized from isopropanol to give 3-propionyloxymethyl-11-propionyl-1,2,3,4,6,11,12,12a-octahydropyrido[2,1-c][1,4]benzodiazepine, m.p. 201°–203°C.

EXAMPLE 13

A. 5,10,11,11a-Tetrahydro-1H,3H-thiazolo[4,3-c][1,4]benzodiazepine-5,11-dione

Methyl 3-(2-nitrobenzoyl)thiazole-4-carboxylate was prepared by reaction of 35.8 g. (0.17 mole) of methyl 4-thiazolecarboxylate hydrochloride with 35.8 g. (0.16 mole) of 2-nitrobenzoyl chloride in 50 ml. of chloroform in the presence of 37 ml. of triethylamine using the procedure described above in Example 10A. The product was dissolved in 210 ml. of ethanol and added cautiously, with cooling as necessary to control the exothermic reaction, to a mixture of 130 g. (2.3 g. atoms) of iron powder in 800 ml. of ethanol, 35 ml. of glacial acetic acid, and 230 ml. of water. When the addition was complete, the mixture was refluxed and stirred for three hours, then neutralized cautiously with 44 g. of solid sodium carbonate, stirred an additional five minutes and filtered while hot. The filter was washed with 1.8 liters of hot ethanol, and the solid which separated from the filtrate was collected and recrystallized from chloroform/ethanol to give 18.97 g. of 5,10,11,11a-tetrahydro-1H,3H-thiazolo[4,3-c][1,4]-benzodiazepine-5,11-dione, m.p. 235.5°–237°C. having the formula:

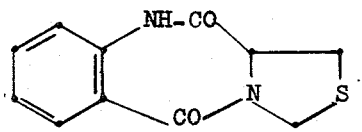

B. 5,10,11,11a-Tetrahydro-1H,3H-thiazolo[4,3-c][1,4]benzodiazepine was prepared by reducing 87.5 g. (0.37 mole) of 5,10,11,11a-tetrahydro-1H,3H-thiazolo[4,3-c][1,4]benzodiazepine-5,11-dione with 45.8 g. (1.2 mole) of lithium aluminum hydride in 1500 ml. of tetrahydrofuran using the procedure described above in Example 1B.

C. 10-Propionyl-5,10,11,11a-tetrahydro-1H,3H-thiazolo[4,3-c]-[1,4]benzodiazepine was prepared by reaction of 26.3 g. (0.128 mole) of 5,10,11,11a-tetrahydro-1H,3H-thiazolo[4,3-c][1,4]-benzodiazepine with 50 ml. of propionic anhydride using the procedure described above in Example 1C. The product was isolated in the form of the free base to give 3.24 g. of 10-propionyl-5,10,11,11a-tetrahydro-1H,3H-thiazolo[4,3-c][1,4]-benzodiazepine, m.p. 194°–196°C.

D. 10-Propionyl-5,10,11,11a-tetrahydro-1H,3H-thiazolo[4,3-c]-[1,4]benzodiazepine-2-oxide is prepared by oxidation of 10-propionyl-5,10,11,11a-tetrahydro-1H,3H-thiazolo[4,3-c][1,4]benzodiazepine with one molar equivalent of hydrogen peroxide in glacial acetic acid.

E. 10-Propionyl-5,10,11,11a-tetrahydro-1H,3H-thiazolo[4,3-c]-[1,4]benzodiazepine-2,2-dioxide is prepared by oxidation of 10-propionyl-5,10,11,11a-tetrahydro-1H,3H-thiazolo[4,3-c][1,4]-benzodiazepine with two molar equivalents of hyrogen peroxide in glacial acetic acid.

EXAMPLE 14

A. Ethyl 1,2,3,10,11,11a-hexahydro-5H-pyrrolo[2,1-c][1,4]-benzodiazepine-5,11-dione-3-carboxylate was prepared by reaction of 14.0 g. (0.07 mole) of 2-nitrobenzoyl chloride with 14.8 g. (0.07 mole) of diethyl 2,5-pyrrolidinedicarboxylate in 50 ml. of chloroform in the presence of 14.15 g. (0.14 mole) of triethylamine and catalytic reduction of the resulting diethyl 1-(2-nitrobenzoyl)-2,5-pyrrolidinedicarboxylate (30.6 g., 0.084 mole) in 400 ml. of absolute ethanol with hydrogen over 2.0 g. of Raney nickel all according to the procedure described above in Example 10A. The product was recrystallized from ethanol to give 17.81 g. of ethyl 1,2,3,10,11,11a-hexahydro-5H-pyrrolo[2,1-c]-[1,4]benzodiazepine-5,11-dione-3-carboxylate, m.p. 188°–189°C. having the formula:

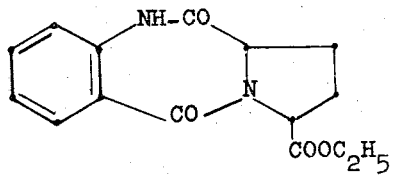

B. 3-Hydroxymethyl-1,2,3,10,11,11a-hexahydro-5H-pyrrolo[2,1-c]-[1,4]benzodiazepine was prepared by reduction of 7.23 g. (0.026 mole) of ethyl 1,2,3,10,11,-11a-hexahydro-5H-pyrrolo[2,1-c][1,4]-benzodiazepine-5,11-dione-3-carboxylate with 3.95 g. (0.104 mole) of lithium aluminum hydride in 200 ml. of tetrahydrofuran using the procedure described above in Example 1B.

C. 10-Propionyl-3-hydroxymethyl-1,2,3,10,11,11a-hexahydro-5H-pyrrolo[2,1-c][1,4]benzodiazepine hydrochloride was prepared by reaction of 6.3 g. (0.029 mole) of 3-hydroxymethyl-1,2,3,10,11,11a-hexahydro-5H-pyrrolo[2,1-c][1,4]benzodiazepine in 30 ml. of propionic anhydride containing a drop of sulfuric acid using the procedurre described above in Example 1C. The product was converted to the hydrochloride salt which was recrystallized twice from methanol to give 2.74 g. of 10-propionyl-3-hydroxymethyl-1,2,3,10,11,11a-hexahydro-5H-pyrrolo[2,1-c][1,4]benzodiazepine hydrochloride, m.p. 242°–243°C.

EXAMPLE 15

A. 5,7,12,13,13a,14-Hexahydroisoquino[3,2-c][1,4]benzodiazepine-7,13-dione 1,2,3,4-Tetrahydroisoquinoline-3-carboxylic acid hydrochloride [17.7 g., 0.1 mole, prepared according to the procedure described by Archer, J. Org. Chem. 16, 430 (1951)] was reacted with 16.3 g. (0.1 mole) of isatoic anhydride in 100 ml. of refluxing dimethylformamide using the procedure described above in Example 1A. The product was recrystallized once from acetonitrile, once from ethanol, and once from dimethylformamide/water to give 3.7 g. of 5,7,12,13,13a,14-hexahydroisoquino[3,2-c][1,4]benzodiazepine-7,13-dione, m.p. 248°–251°C. having the formula:

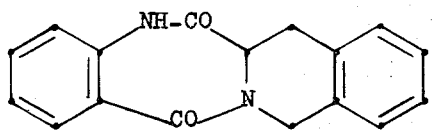

B. 5,7,12,13,13a,14-Hexahydroisoquino[3,2-c][1,4]benzodiazepine was prepared by reducing 44 g. (0.16 mole) of 5,7,12,13,13a,14-hexahydroisoquino[3,2-c][1,4]benzodiazepine-7,13- dione with 14.4 g. (0.38 mole) of lithium aluminum hydride in 300 ml. of tetrahydrofuran using the procedure described above in Example 1B. There was thus obtained 5,7,12,13,13a,14-hexahydroisoquino[3,2-c][1,4]benzodiazepine as a viscous oil.

C. 12-Propionyl-5,7,12,13,13a,14-hexahydroisoquino[3,2-c][1,4]-benzodiazepine p-toluenesulfonate was prepared by reaction of 5,7,12,13,13a,14-hexahydroisoquino[3,2-c][1,4]benzodiazepine with 40 ml. of propionic anhydride in the presence of a drop of concentrated sulfuric acid using the procedure described above in Example 1C. The product was isolated in the form of the p-toluenesulfonate salt and recrystallized from methanol to give 11.5 g. of 12-propionyl-5,7,12,13,13a,14-hexahydroisoquino[3,2-c][1,4]benzodiazepine p-toluenesulfonate, m.p. 263°–264°C.

EXAMPLE 16

A. 1,4,6,11,12,12a-Hexahydropyrido[2,1-c][1,4]benzodiazepine-6,12-dione was prepared by reaction of 17.6 g. (0.108 mole) of isatoic anhydride with 17.6 g. (0.108 mole) of 1,2,3,6-tetrahydropyridine-2-carboxylic acid hydrochloride in 60 ml. of dimethylformamide in the presence of 11.1 g. of triethylamine using the procedure described above in Example 1A. The product was recrystallized from acetonitrile/ether to give 9.4 g. of 1,4,6,11,12,12a-hexahydropyrido[2,1-c][1,4]-benzodiazepine-6,12-dione, m.p. 232°–235°C. having the formula:

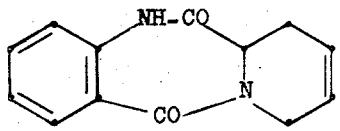

B. 1,4,6,11,12,12a-Hexahydropyrido[2,1-c][1,4]benzodiazepine was prepared by reduction of 10.7 g. (0.047 mole) of 1,4,6,11,12,12a-hexahydropyrido[2,1-c][1,4]benzodiazepine-6,12-dione with 3.0 g. (0.08 mole) of lithium aluminum hydride in 125 ml. of tetrahydrofuran using the procedure described above in Example 1B. The product was isolated in the form of the free base as a yellow solid to give 9.3 g. of 1,4,6,11,12,12a-hexahydropyrido[2,1-c][1,4]benzodiazepine.

C. 11-Propionyl-1,4,6,11,12,12a-hexahydropyrido[2,1-c][1,4]-benzodiazepine p-toluenesulfonate was prepared by reaction of 9.3 g. (0.047 mole) of 1,4,6,11,12,12a-hexahydropyrido[2,1-c]-[1,4]benzodiazepine with 30 ml. of propionic anhydride in the presence of a drop of sulfuric acid using the procedure described above in Example 1C. The product was converted to the p-toluenesulfonate salt and recrystallized from isopropanol/ether to give 7.4 g. of 11-propionyl-1,4,6,11,12,12a-hexahydropyrido[2,1-c][1,4]benzodiazepine p-toluenesulfonate, m.p. 150°–152°C.

EXAMPLE 17

9-Methyl-11-(4-methylbenzoyl)-1,2,3,4,6,11,12,12a-octahydropyrido[2,1-c][1,4]benzodiazepine is obtained by reaction of 4-methyl-2-nitrobenzoyl chloride (prepared from the known acid) with methyl piperidine-2-carboxylate; catalytic reduction of the resulting methyl 1-(2-nitro-4-methylbenzoyl)piperidine-2-carboxylate with hydrogen over Raney nickel; lithium aluminum hydride reduction of the resulting 9-methyl-1,2,3,4,6,11,12,12a-octahydropyrido[2,1-c][1,4]benzodiazepine-6,12-dione; and reaction of the resulting 9-methyl-1,2,3,4,6,11,12,12a-octahydropyrido[2,1-c][1,4]benzodiazepine with 4-methylbenzoyl chloride all as described above in Examples 1B, 2, and 10A.

EXAMPLE 18

10-Chloro-11-(3,4,5-trimethoxybenzoyl)-1,2,3,4,6,11,12,12a-octahydropyrido[2,1-c][1,4]benzodiazepine is prepared by reaction of 3-chloro-2-nitrobenzoyl chloride (prepared from the known acid) with methyl piperidine-2-carboxylate; catalytic reduction of the resulting methyl 1-(3-chloro-2-nitrobenzoyl)piperidine-2-carboxylate with hydrogen over Raney nickel; lithium aluminum hydride reduction of the resulting 10-chloro-1,2,3,4,6,11,12,12a-octahydropyrido[2,1-c]-[1,4]benzodiazepine-6,12-dione; and reaction of the resulting 10-chloro-1,2,3,4,6,11,12,12a-octahydropyrido[2,1-c][1,4]-benzodiazepine with 3,4,5-trimethoxybenzoyl chloride all according to the procedures described above in Examples 1B, 2, and 10A.

EXAMPLE 19

9-Chloro-11-(4-methylmercaptobenzoyl)-1,2,3,4,6,11,12,12a-octahyropyrido[2,1-c][1,4]benzodiazepine is prepared by reaction of the known 4-chloro-2-nitrobenzoyl chloride with methyl piperidine-2-carboxylate; catalytic reduction of the resulting methyl 1-(2-nitro-4-chlorobenzoyl)piperidine-2-carboxylate with hydrogen over Raney nickel; lithium aluminum hydride reduction of the resulting 9-chloro-1,2,3,4,6,11,12,12a-octahydropyrido[2,1-c][1,4]benzodiazepine-6,12-dione; and reaction of the resulting 9-chloro-1,2,3,4,6,11,12,12a-octahydropyrido[2,1-c][1,4]benzodiazepine with 4-methylmercaptobenzoyl chloride all according to the procedures described above in Examples 1B, 2, and 10A.

EXAMPLE 20

7-Fluoro-11-(4-methylsulfinylbenzoyl)-1,2,3,4,6,11,12,12a-octahydropyrido[2,1-c][1,4]benzodiazepine is prepared by reaction of 6-fluoro-2-nitrobenzoyl chloride (prepared from the known acid) with methyl piperidine-2-carboxylate; catalytic reduction of the resulting methyl 1-(2-nitro-6-fluorobenzoyl)piperidine-2-carboxylate; lithium aluminum hydride reduction of the resulting 7-fluoro-1,2,3,4,6,11,12,12a-octahydropyrido[2,1-c][1,4]benzodiazepine-6,12-dione; and reaction of the resulting 7-fluoro-1,2,3,4,6,11,12,12a-octahydropyrido[2,1-c][1,4]benzodiazepine with 4-methylsulfinylbenzoyl chloride all according to the procedures described above in Examples 1B, 2, and 10A.

EXAMPLE 21

10-Methoxy-11-(4-methylsulfonylbenzoyl)-1,2,3,4,6,11,12,12a-octahydropyrido[2,1-c][1,4]benzodiazepine is prepared by reaction of 3-methoxy-2-nitrobenzoyl chloride (preparerd from the known acid) with methyl piperidine-2-carboxylate; catalytic reduction of the resulting methyl 1-(2-nitro-3-methoxybenzoyl)piperidine-2-carboxylate with hydrogen over Raney nickel; lithium aluminum hydride reduction of the resulting 10-methoxy-1,2,3,4,6,11,12,12a-octahydropyrido[2,1-c][1,4]benzodiazepine-6,12-dione; and reaction of the resulting 10-methoxy-1,2,3,4,6,11,12,12a-tetrahydropyrido[2,1-c][1,4]benzodiazepine with 4-methylsulfonylbenzoyl chloride all according to the procedures described above in Examples 1B, 2, and 10A.

EXAMPLE 22

10-Methyl-11-(2-chlorobenzoyl)-1,2,3,4,6,11,12,12a-octahydropyrido[2,1-c][1,4]benzodiazepine is prepared by reaction of the known 3-methyl-2-nitrobenzoyl chloride with methyl piperidine-2-carboxylate; catalytic reduction of the resulting methyl 1-(2-nitro-3-methylbenzoyl)piperidine-2-carboxylate with hydrogen over Raney nickel; lithium aluminum hydride reduction of the resulting 10-methyl-1,2,3,4,6,11,12,12a-octahydropyrido[2,1-c][1,4]benzodiazepine-6,12-dione; and reaction of the resulting 10-methyl-1,2,3,4,6,11,12,12a-octahydropyrido[2,1-c][1,4]benzodiazepine with 2-chlorobenzoyl chloride all according to the procedures described above in Examples 1B, 2, and 10A.

EXAMPLE 23

8-Methoxy-10-(2-chloro-4-methoxybenzoyl)-1,2,3,10,11,11a-hexahydro-5H-pyrrolo[2,1-c][1,4]benzodiazepine is prepared by reaction of 4-methoxy-2-nitrobenzoyl chloride (prepared from the known acid) with methyl pyrrolidine-2-carboxylate; catalytic reduction of the resulting methyl 1-(2-nitro-4-methoxybenzoyl)-pyrrolidine-2-carboxylate with hydrogen over Raney nickel; lithium aluminum hyride reduction of the resulting 8-methoxy-1,2,3,10,11,11a-hexahydro-5H-pyrrolo[2,1-c][1,4]benzodiazepine-5,11-dione; and reaction of the resulting 8-methoxy-1,2,3,10,11,11a-hexahydro-5H-pyrrolo[2,1-c][1,4]benzodiazepine with 2-chloro-4-methoxybenzoyl chloride all according to the procedures described above in Examples 1B, 2, and 10A.

EXAMPLE 24

7,8-Dibenzyloxy-10-(2,4,6-trichlorobenzoyl)-1,2,3,10,11,11a-hexahydro-5H-pyrrolo[2,1-c][1,4]benzodiazepine is prepared by reaction of 4,5-dibenzyloxy-2-nitrobenzoyl chloride (prepared from the known acid) with methyl pyrrolidine-2-carboxylate; catalytic reduction of the resulting methyl 1-(2-nitro-4,5-dibenzyloxybenzoyl)pyrrolidine-2-carboxylate with hydrogen over Raney nickel; lithium aluminum hydride reduction of the resulting 7,8-dibenzyloxy-1,2,3,10,11,11a-hexahydro-5H-pyrrolo-[2,1-c][1,4]benzodiazepine-5,11-dione; and reaction of the resulting 7,8-dibenzyloxy-1,2,3,10,11,11a-hexahydro-5H-pyrrolo[2,1-c][1,4]benzodiazepine with 2,4,6-tribromobenzoyl chloride all according to the procedures described above in Examples 1B, 2, and 10A.

EXAMPLE 25

7,8-Diethoxy-10-(4-fluorobenzoyl)-1,2,3,10,11,11a-hexahydro-5H-pyrrolo[2,1-c][1,4]benzodiazepine is prepared by reaction of 4,5-diethoxy-2-nitrobenzoyl chloride (prepared from the known methyl ester by saponification of the latter and reaction of the resulting acid with thionyl chloride) with methyl pyrrolidine-2-carboxylate; catalytic reduction of the resulting methyl 1-(2-nitro-4,5-diethoxybenzoyl)pyrrolidine-2-carboxylate with hydrogen over Raney nickel; lithium aluminum hydride reduction of the resulting 7,8-diethoxy-1,2,3,10,11,11a-hexahydro-5H-pyrrolo[2,1-c][1,4]benzodiazepine-5,11-dione; and reaction of the resulting 7,8-diethoxy-1,2,3,10,11,11a-hexahydro-5H-pyrrolo[2,1-c][1,4]benzodiazepine with 4-chlorobenzoyl chloride all according to the procedures described above in Examples 1B, 2, and 10A.

EXAMPLE 26

9-(N-Ethyl-N-propionyl)-8-chloro-11-propionyl-1,2,3,4,6,11,12,12a-octahydropyrido[2,1-c][1,4]benzodiazepine is prepared by reaction of the known 2,4-dinitro-5-chlorobenzoyl chloride with methyl piperidine-2-carboxylate; catalytic reduction of the resulting methyl 1-(2,4-dinitro-5-chlorobenzoyl)piperidine-2-carboxylate with hydrogen over Raney nickel in glacial acetic acid; lithium aluminum hydride reduction of the resulting 9-acetylamino-8-chloro-1,2,3,4,6,11,12,12a-octahydropyrido-[2,1-c][1,4]benzodiazepine-6,12-dione; and reaction of the resulting 9-ethylamino-8-chloro-1,2,3,4,6,11,12,12a-octahydropyrido[2,1-c][1,4]benzodiazepine with propionyl chloride all according to the procedures described above in Examples 1B, 2, and 10A.

EXAMPLE 27

10-Benzyloxy-9-methyl-11-(2-chloro-4-methoxy-6-methylbenzoyl)-1,2,3,4,6,11,12,12a-octahydropyrido[2,1-c][1,4]benzodiazepine is prepared by reaction of 3-benzyloxy-4-methoxy-2-nitrobenzoyl chloride (prepared by reaction of the known acid with thionyl chloride) with methyl piperidine-2-carboxylate; catalytic reduction of the resulting methyl 1-(3-benzyloxy-4-methyl-2-nitrobenzoyl)piperidine-2-carboxylate with hydrogen over Raney nickel; lithium aluminum hydride reduction of the resulting 10-benzyloxy-9-methyl-1,2,3,4,6,11,12,12a-octahydropyrido[2,1-c]-[1,4]benzodiazepine-6,12-dione; and reaction of the resulting 10-benzyloxy-9-methyl-1,2,3,4,6,11,12,12a-octahydropyrido-[2,1-c][1,4]benzodiazepine with 2-chloro-4-methoxy-6-methylbenzoyl chloride all according to the procedures described above in Examples 1B, 2, and 10A. 10-Hydroxy-9-methyl-1,2,3,4,6,11,12,12a-octahydropyrido[2,1-c][1,4]benzodiazepine is prepared from the latter by catalytic debenzylation over a palladium-on-charcoal catalyst.

EXAMPLE 28

7-Methoxy-11-(3,4-methylenedioxybenzoyl)-1,2,3,4,6,11,12,12a-octahydropyrido[2,1-c][1,4]benzodiazepine is prepared by reaction of the known 6-methoxy-2-nitrobenzoyl chloride with methyl piperidine-2-carboxylate; catalytic reduction of the resulting methyl 1-(6-methoxy-2-nitrobenzoyl)piperidine-2-carboxylate with hydrogen over Raney nickel; lithium aluminum hydride reduction of the resulting 7-methoxy-1,2,3,4,6,11,12,12a-octahydropyrido[2,1-c][1,4]benzodiazepine-6,12-dione; and reaction of the resulting 7-methoxy-1,2,3,4,6,11,12,12a-octahydropyrido[2,1-c][1,4]benzodiazepine with 3,4-methylenedioxybenzoyl chloride all according to the procedures described above in Examples 1B, 2, and 10A.

EXAMPLE 29

7-Chloro-11-acetyl-1,2,3,4,6,11,12,12a-octahydropyrido[2,1-c]-[1,4]benzodiazepine is prepared by reaction of the known 6-chloro-2-nitrobenzoyl chloride with methyl piperidine-2-carboxylate; catalytic reduction of the resulting methyl 1-(6-chloro-2-nitrobenzoyl)piperidine-2-carboxylate with hydrogen over Raney nickel; lithium aluminum hydride reduction of the resulting 7-chloro-1,2,3,4,6,11,12,12a-octahydropyrido[2,1-c]-[1,4]benzodiazepine-6,12-dione; and reaction of the resulting 7-chloro-1,2,3,4,6,11,12,12a-octahydropyrido[2,1-c][1,4]-benzodiazepine with acetic anhydride all according to the procedures described above in Examples 1B, 1C, and 10A.

EXAMPLE 30

9-Methoxy-11-acetyl-1,2,3,4,6,11,12,12a-octahydropyrido-[2,1-c][1,4]benzodiazepine is prepared by reaction of the known 4-methoxy-2-nitrobenzoyl chloride with methyl piperidine-2-carboxylate; catalytic reduction of the resulting methyl 1-(4-methoxy-2-nitrobenzoyl)piperidine-2-carboxylate with hydrogen over Raney nickel; lithium aluminum hydride reduction of the resulting 9-methoxy-1,2,3,4,6,11,12,12a-octahydropyrido[2,1-c]-[1,4]benzodiazepine-6,12-dione; and reaction of the resulting 9-methoxy-1,2,,3,4,6,11,12,12a-octahydropyrido[2,1-c][1,4]-benzodiazepine with acetic anhydride all according to the procedures described above in Examples 1B, 1C, and 10A.

EXAMPLE 31

8-Benzyloxy-11-acetyl-1,2,3,4,6,11,12,12a-octahydropyrido[2,1-c]-[1,4]benzodiazepine is prepared by reaction of the known 5-benzyloxy-2-nitrobenzoyl chloride with methyl piperidine-2-carboxylate; catalytic reduction of the resulting methyl 1-(5-benzyloxy-2-nitrobenzoyl)piperidine-2-carboxylate with hydrogen over Raney nickel; lithium aluminum hydride reduction of the resulting 8-benzyloxy-1,2,3,4,6,11,12,12a-octahydropyrido[2,1-c][1,4]-benzodiazepine-6,12-dione; and reaction of the resulting 8-benzyloxy-1,2,3,4,6,11,12,12a-octahydropyrido[2,1-c][1,4]-benzodiazepine with acetic anhydride all according to the procedures described above in Examples 1B, 1C, and 10A.

EXAMPLE 32

7,8,9-Trimethoxy-10-acetyl-1,2,3,10,11,11a-hexahydro-5H-pyrrolo-[2,1-c][1,4]benzodiazepine is prepared by reaction of 3,4,5-trimethoxy-2-nitrobenzoyl chloride (prepared by saponification of the known methyl ester and reaction of the resulting carboxylic and with thionyl chloride) with methyl pyrrolidine-2-carboxylate; catalytic reduction of the resulting methyl 1-(3,4,5-trimethoxy-2-nitrobenzoyl)pyrrolidine-2-carboxylate with hydrogen over Raney nickel; lithium aluminum hydride reduction of the resulting 7,8,9-trimethoxy-1,2,3,10,11,11a-hexahydro-5H-pyrrolo[2,1-c][1,4]benzodiazepine-5,11-dione; and reaction of the resulting 7,8,9-trimethoxy-1,2,3,10,11,11a-hexahydro-5H-pyrrolo[2,1-c][1,4]benzodiazepine with acetic anhydride all according to the procedures described above in Examples 1B, 1C, and 10A.

EXAMPLE 33

6,9-Dimethoxy-10-acetyl-1,2,3,10,11,11a-hexahydro-5H-pyrrolo-[2,1-c][1,4]benzodiazepine is prepared by reaction of the known 3,6-dimethoxy-2-nitrobenzoyl chloride with methyl pyrrolidine-2-carboxylate; catalytic reduction of the resulting methyl 1-(3,6-dimethoxy-2-nitrobenzoyl)pyrrolidine-2-carboxylate with hydrogen over Raney nickel; lithium aluminum hydride reduction of the resulting 6,9-dimethoxy-1,2,3,10,11,11a-hexahydro-5H-pyrrolo-[2,1-c][1,4]benzodiazepine-5,11-dione; and reaction of the resulting 6,9-dimethoxy-1,2,3,10,11,11a-hexahydro-5H-pyrrolo-[2,1-c][1,4]benzodiazepine with acetic anhydride all according to the procedures described above in Examples 1B, 1C, and 10A.

EXAMPLE 34

7,8-Methylenedioxy-10-propionyl-1,2,3,10,11,11a-hexahydro-5H-pyrrolo[2,1-c][1,4]benzodiazepine is prepared by reaction of 4,5-methylenedioxy-2-nitrobenzoyl chloride (prepared by oxidation of the known aldehyde with potassium permanganate and reaction of the resulting carboxylic acid with thionyl chloride) with methyl pyrrolidine-2-carboxylate; catalytic reduction of the resulting methyl 1-(4,5-methylenedioxy-2-nitrobenzoyl)pyrrolidine-2-carboxylate with hydrogen over Raney nickel; lithium aluminum hydride reduction of the resulting 7,8-methylenedioxy-1,2,3,10,11,11a-hexahydro-5H-pyrrolo[2,1-c][1,4]benzodiazepine-5,11-dione; and reaction of the resulting 7,8-methylenedioxy-1,2,3,10,11,11a-hexahydro-5H-pyrrolo[2,1-c][1,4]benzodiazepine with propionic anhydride all according to the procedures described above in Examples 1B, 1C, and 10A.

EXAMPLE 35

By reducing the compounds described above in Examples 1C, 2, 4C, 5D, 6C, 7C, 8, 9, 10C, 11D, 12C, 13C, 14C, 15C, 16C, 17–19, and 22–34 with lithium aluminum hydride in tetrahydrofuran using the procedure described above in Example 1B and isolating the products in the form of the free bases, there can be obtained the following respective compounds of formula I:

A. 10-Propyl-1,2,3,10,11,11a-hexahydro-5H-pyrrolo-[2,1-c][1,4]benzodiazepine;

B. 10-(2-Hydroxypropyl)-1,2,3,10,11,11a-hexahydro-5H-pyrrolo[2,1-c][1,4]benzodiazepine;

C. 7-Chloro-10-propyl-1,2,3,10,11,11a-hexahydro-5H-pyrrolo[2,1-c][1,4]benzodiazepine;

D. 7-(N-Ethyl-N-propylamino)-10-propyl-1,2,3,10,11,11a-hexahydro-5H-pyrrolo[2,1-c][1,4]benzodiazepine;

E. 2-Hydroxy-10-propyl-1,2,3,10,11,11a-hexahydro-5H-pyrrolo[2,1-c][1,4]benzodiazepine;

F. 11-Ethyl-1,2,3,4,6,11,12,12a-octahydropyrido-[2,1-c][1,4]benzodiazepine;

G. 11-Propyl-1,2,3,4,6,11,12,12a-octahydropyrido-[2,1-c][1,4]benzodiazepine;

H. 11-Benzyl-1,2,3,4,6,11,12,12a-octahydropyrido-[2,1-c][1,4]benzodiazepine;

I. 8-Chloro-11-propyl-1,2,3,4,6,11,12,12a-octahydro-pyrido[2,1-c][1,4]benzodiazepine;

J. 8-(N-Butyl-N-ethylamino)-11-butyl-1,2,3,4,6,11,12,12a-octahydropyrido[2,1-c][1,4]benzodiazepine;

K. 3-Hydroxymethyl-11-propyl-1,2,3,4,6,11,12,12a-octahydropyrido[2,1-c][1,4]benzodiazepine;

L. 10-Propyl-5,10,11,11a-tetrahydro-1H,3H-thiazolo-[4,3-c][1,4]benzodiazepine;

M. 10-Propyl-3-hydroxymethyl-1,2,3,10,11,11a-hexahydro-5H-pyrrolo[2,1-c][1,4]benzodiazepine;

N. 12-Propyl-5,7,12,13,13a,14-hexahydroisoquino-[3,2-c][1,4]benzodiazepine;

O. 11-Propyl-1,4,6,11,12,12a-hexahydropyrido[2,1-c]-[1,4]benzodiazepine;

P. 9-Methyl-11-(4-methylbenzyl)-1,2,3,4,6,11,12,12a-octahydropyrido[2,1-c][1,4]benzodiazepine;

Q. 10-Chloro-11-(3,4,5-trimethoxybenzyl)-1,2,3,4,6,11,12,12a-octahydropyrido[2,1-c][1,4]benzodiazepine;

R. 9-Chloro-11-(4-methylmercaptobenzyl)-1,2,3,4,6,11,12,12a-octahydropyrido[2,1-c][1,4]benzodiazepine;

S. 10-Methyl-11-(2-chlorobenzyl)-1,2,3,4,6,11,12,12a-octahydropyrido[2,1-c][1,4]benzodiazepine;

T. 8-Methoxy-10-(2-chloro-4-methoxybenzyl)-1,2,3,10,11,11a-hexahydro-5H-pyrrolo[2,1-c][1,4]benzodiazepine;

U. 7,8-Dibenzyloxy-10-(2,4,6-trichlorobenzyl)-1,2,3,10,11,11a-hexahydro-5H-pyrrolo[2,1-c][1,4]benzodiazepine;

V. 7,8-Diethoxy-10-(4-fluorobenzyl)-1,2,3,10,11,11a-hexahydro-5H-pyrrolo[2,1-c][1,4]benzodiazepine;

W. 9-(N-Ethyl-N-propyl)-8-chloro-11-propyl-1,2,3,4,6,11,12,12a-octahydropyrido[2,1-c][1,4]benzodiazepine;

X. 10-Benzyloxy-9-methyl-11-(2-chloro-4-methoxy-6-methylbenzyl)-1,2,3,4,6,11,12,12a-octahydropyrido[2,1-c][1,4]-benzodiazepine;

Y. 7-Methoxy-11-(3,4-methylenedioxybenzyl)-1,2,3,4,6,11,12,12a-octahydropyrido[2,1-c][1,4]benzodiazepine;

Z. 7-Chloro-11-ethyl-1,2,3,4,6,11,12,12aoctahydropyrido[2,1-c][1,4]benzodiazepine;

AA. 9-Methoxy-11-ethyl-1,2,3,4,6,11,12,12a-octahydropyrido-[2,1-c][1,4]benzodiazepine;

BB. 8-Benzyloxy-11-ethyl-1,2,3,4,6,11,12,12a-octahydropyrido[2,1-c][1,4]benzodiazepine;

CC. 7,8,9-Trimethoxy-10-ethyl-1,2,3,10,11,11a-hexahydro-5H-pyrrolo[2,1-c][1,4]benzodiazepine;

DD. 6,9-Dimethoxy-10-ethyl-1,2,3,10,11,11a-hexahydro-5H-pyrrolo[2,1-c][1,4]benzodiazepine; and EE. 7,8-Methylenedioxy-10-propyl-1,2,3,10,11,11a-hexahydro-5H-pyrrolo[2,1-c][1,4]benzodiazepine.

I claim:

1. A compound having the formula:

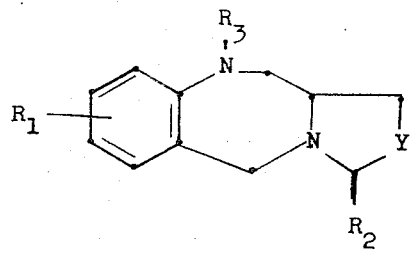

wherein $R_1$ is hydrogen or methylenedioxy attached to adjacent carbon atoms or from one to three members of the group consisting of lower-alkyl, lower-alkoxy, fluorine, chlorine, dilower-alkylamino, N-lower-alkyl-N-lower-alkanoylamino, hydroxy, and benzyloxy; $R_2$ is hydrogen, hydroxymethyl, or lower-alkanoyloxymethyl; $R_3$ is lower-alkyl, lower-alkanoyl, α-lower-alkanoyloxy-lower-alkanoyl, benzoyl, benzyl, or benzoyl or benzyl substituted by methylenedioxy attached to adjacent carbon atoms or from one to three members of the group consisting of lower-alkyl, lower-alkoxy, fluorine, chlorine, lower-alkylmercapto, lower-alkylsulfinyl, lower-alkylsulfonyl, or hydroxy; and Y is one of the groups:

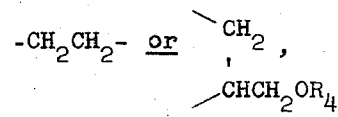

where $R_4$ is hydrogen or lower-alkanoyl.

2. A compound according to claim 1 where Y is:

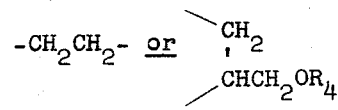

3. A compound according to claim 2 where Y is —CH$_2$CH$_2$—; $R_2$ is hydrogen; and $R_3$ is lower-alkanoyl or benzoyl.

4. A compound according to claim 2 where Y is

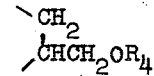

$R_2$ is hydrogen; and $R_3$ and $R_4$ are lower-alkanoyl.

5. 11-Acetyl-1,2,3,4,6,11,12,12a-octahydropyrido-[2,1-c][1,4]benzodiazepine according to claim 3 where $R_1$ is hydrogen; and $R_3$ is acetyl.

6. 11-Propionyl-1,2,3,4,6,11,12,12a-octahydropyrido-[2,1-c][1,4]benzodiazepine according to claim 3 where $R_1$ is hydrogen; and $R_3$ is lower-alkanoyl.

7. 8-Chloro-11-propionyl-1,2,3,4,6,11,12,12a-octahydropyrido[2,1-c][1,4]benzodiazepine according to claim 3 where $R_1$ is 8-chloro; and $R_3$ is propionyl.

8. 11-Benzoyl-1,2,3,4,6,11,12,12a-octahydropyrido-[2,1-c][1,4]benzodiazepine according to claim 3 where $R_1$ is hydrogen; and $R_3$ is benzoyl.

9. 3-Propionyloxymethyl-11-propionyl-1,2,3,4,6,11,12,12a-octahydropyrido[2,1-c][1,4]benzodiazepine according to claim 4 where $R_1$ is hydrogen; and $R_3$ and $R_4$ are each propionyl.

* * * * *

UNITED STATES PATENT AND TRADEMARK OFFICE
CERTIFICATE OF CORRECTION

PATENT NO. : 3,860,600

DATED : January 14, 1975

INVENTOR(S) : Philip M. Carabateas

It is certified that error appears in the above-identified patent and that said Letters Patent are hereby corrected as shown below:

Column 2, line 58, "(1965)" should read -- (1925) --.

Column 2, line 65, "lower-alakanoyloxymethyl" should read -- lower-alkanoyloxymethyl --.

Column 4, line 56, "hyrogen" should read -- hydrogen --.

Column 24, line 4, "dilower-alkylamino" should read -- di-lower-alkylamino --.

Signed and Sealed this

Ninth Day of March 1982

[SEAL]

Attest:

Attesting Officer

GERALD J. MOSSINGHOFF

Commissioner of Patents and Trademarks